United States Patent [19]
Durkin

[11] Patent Number: 5,115,503
[45] Date of Patent: May 19, 1992

[54] SYSTEM FOR ADAPTING ITS CLOCK FREQUENCY TO THAT OF AN ASSOCIATED BUS ONLY WHEN IT REQUIRES USAGE THEREOF

[75] Inventor: Michael D. Durkin, Austin, Tex.

[73] Assignee: Dell U.S.A. Corporation, Austin, Tex.

[21] Appl. No.: 730,383

[22] Filed: Jul. 15, 1991

Related U.S. Application Data

[63] Continuation of Ser. No. 296,796, Jan. 12, 1989, abandoned.

[51] Int. Cl.⁵ .......................... G06F 1/08; G06F 1/12
[52] U.S. Cl. .............................. 395/550; 364/934.71; 364/935.4; 340/825.14
[58] Field of Search ... 364/200 MS File, 900 MS File

[56] References Cited

U.S. PATENT DOCUMENTS

| | | | |
|---|---|---|---|
| 4,095,267 | 6/1978 | Morimoto | 364/205 |
| 4,254,475 | 3/1981 | Cooney et al. | 364/900 |
| 4,631,702 | 12/1986 | Korba | 364/900 |
| 4,677,433 | 6/1987 | Catlin et al. | 340/825.20 |
| 4,787,064 | 11/1988 | Wagner | 364/900 |
| 4,819,164 | 4/1989 | Branson | 364/200 |
| 4,821,229 | 4/1989 | Jauregni | 364/900 |

Primary Examiner—Thomas C. Lee
Assistant Examiner—Paul Harrity
Attorney, Agent, or Firm—Thomas G. Devine

[57] ABSTRACT

A digital computer system has internal and external devices, with the external devices connected to an associated bus. The digital computer system has a clock frequency which is different from that of the associated bus. Memory addresses from the central processor are decoded and for external devices, a frequency adjusting circuit divides the output from a clock oscillator to provide a system clock that is approximately the same frequency as that of the associated bus.

5 Claims, 9 Drawing Sheets

SYSTEM FOR ADAPTING ITS CLOCK FREQUENCY TO THAT OF AN ASSOCIATED BUS ONLY WHEN IT REQUIRES USAGE THEREOF

This application is a continuation, of application Ser. No. 07/296,796, filed Jan. 12, 1989, now abandoned.

BACKGROUND OF THE INVENTION

1. Field of the Invention

This invention relates to digital computer systems having busses for connection to external devices. More particularly, this invention pertains to digital computer systems that have facility for adjusting the system clock frequency to approximately that of the associated bus.

2. Description of the Prior Art

As digital computer system operating speeds have increased, associated bus systems for addressing external devices have not kept pace. It has been necessary for the computer systems to "slow down" to accommodate such busses.

A prior art system has involved adding wait states to a memory access involving the associated bus so that the total time taken is the same as if the system clock frequency were equal to that of the associated bus. This system of using wait states has the disadvantage of abbreviating the addresses and decoding of addresses at the beginning of the cycle.

The present invention has a facility for actually adjusting the clock frequency of the computer system to approximately that of the associated bus to avoid these deleterious effects.

BRIEF SUMMARY OF THE INVENTION

A digital computer system having internal and external devices has the circuitry for adapting its frequency to that of an associated bus which is connected to external devices. A crystal oscillator is divided down, ordinarily, to the desired system clock frequency which, in this preferred embodiment, is approximately 50% higher than the associated bus clock frequency. In this preferred embodiment, the shift in frequency is accomplished by a programmable array of logic (PAL), programmed to divide the crystal oscillator by a predetermined divisor.

A decoder which, in this preferred embodiment, is a PAL programmed to detect those addresses sent by the central processor that are for external devices and therefore will require use of the associated bus is provided. This decoding PAL causes the frequency adjusting PAL to divide the crystal oscillator frequency by a divisor so that the system frequency will be approximately that of the associated bus.

The principal object of this invention is to enable a digital computer system of a higher frequency than that of an associated bus connected to external devices to access those external devices through the bus without adversely effecting the data Another object of this invention is to provide circuitry for adjusting the clock frequency of the digital computer system to approximately that of the associated bus These and other objects will be made evident in the detailed description that follows.

DETAILED DESCRIPTION OF THE INVENTION

FIG. 1 illustrates the digital computer system 10 of this invention in detailed block form. Shown is CPU 11, the central processor, which connects to decode PAL 21 through the local address bus. Decode PAL 21 has an output which is connected to frequency adjust PAL 15. Oscillator 14 is shown having an output connected to frequency adjust PAL 15 which has an output connecting to the input of bus controller 16. Bus controller 16 has an output to CPU 11. Also of interest in FIG. 1c is connector assembly 20, through which the associated bus is connected.

FIG. 2 illustrates oscillator 14, in this preferred embodiment, having a frequency of 50 Mhz providing an output to the clock input of frequency adjust PAL 15. The output relevant to this invention is signal PROFREQ which is connected to terminal X1 of bus controller 16. The output of interest to this invention is on line 19 and is signal PROCCLK which connects to CPU 11 and provides the system clock. PAL 15 is manufactured by ADVANCED MICRO DEVICES and is a type 16R8-D. Following is an equation file describing PAL 15 in detail.

Bus controller 16 is a type 82C201, manufactured by Chips and Technology, in this preferred embodiment.

Figure 2A:
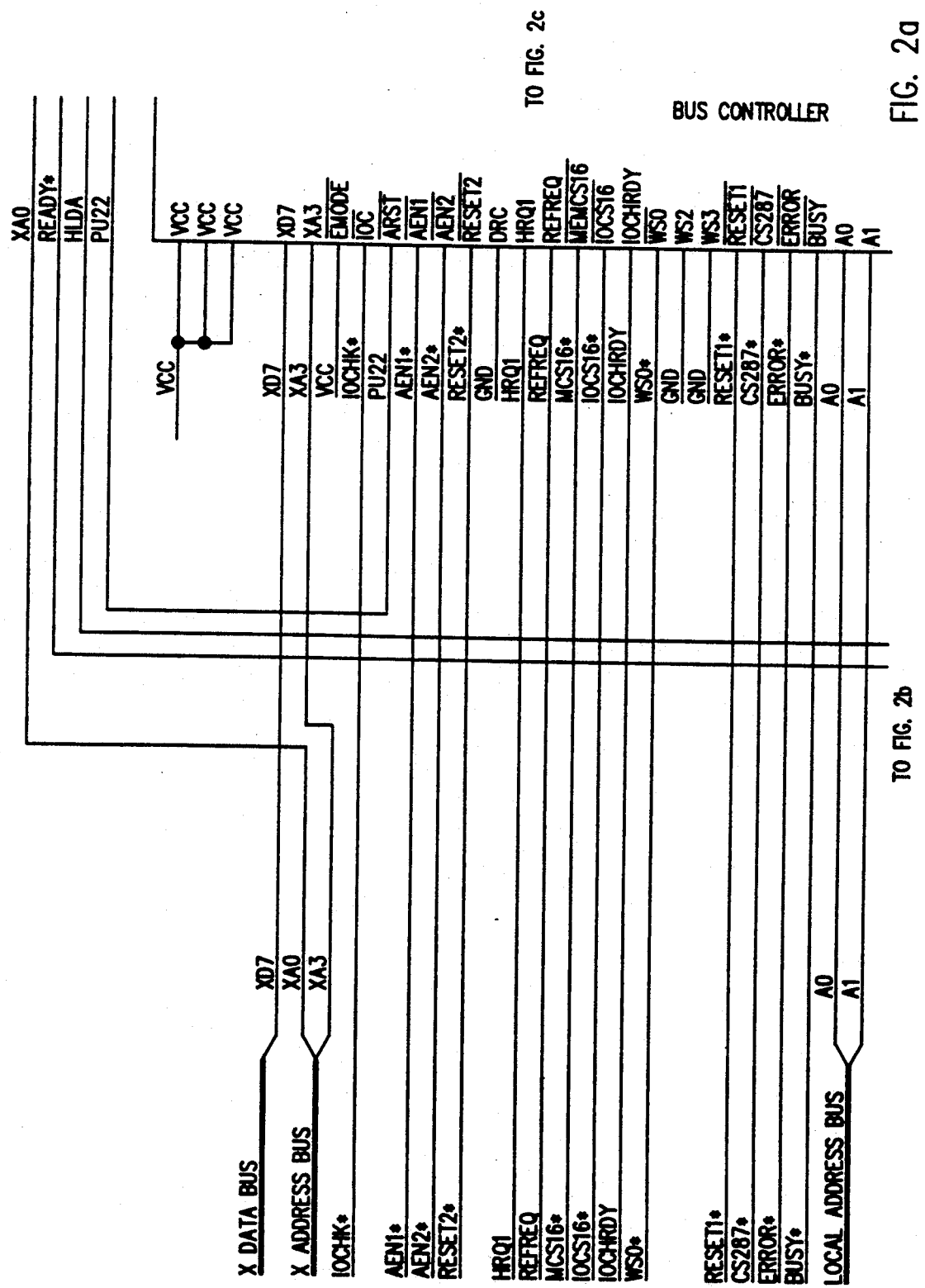
FIGS. 2a-2d schematically illustrates the frequency adjusting circuitry of this invention.
Figure 2B:
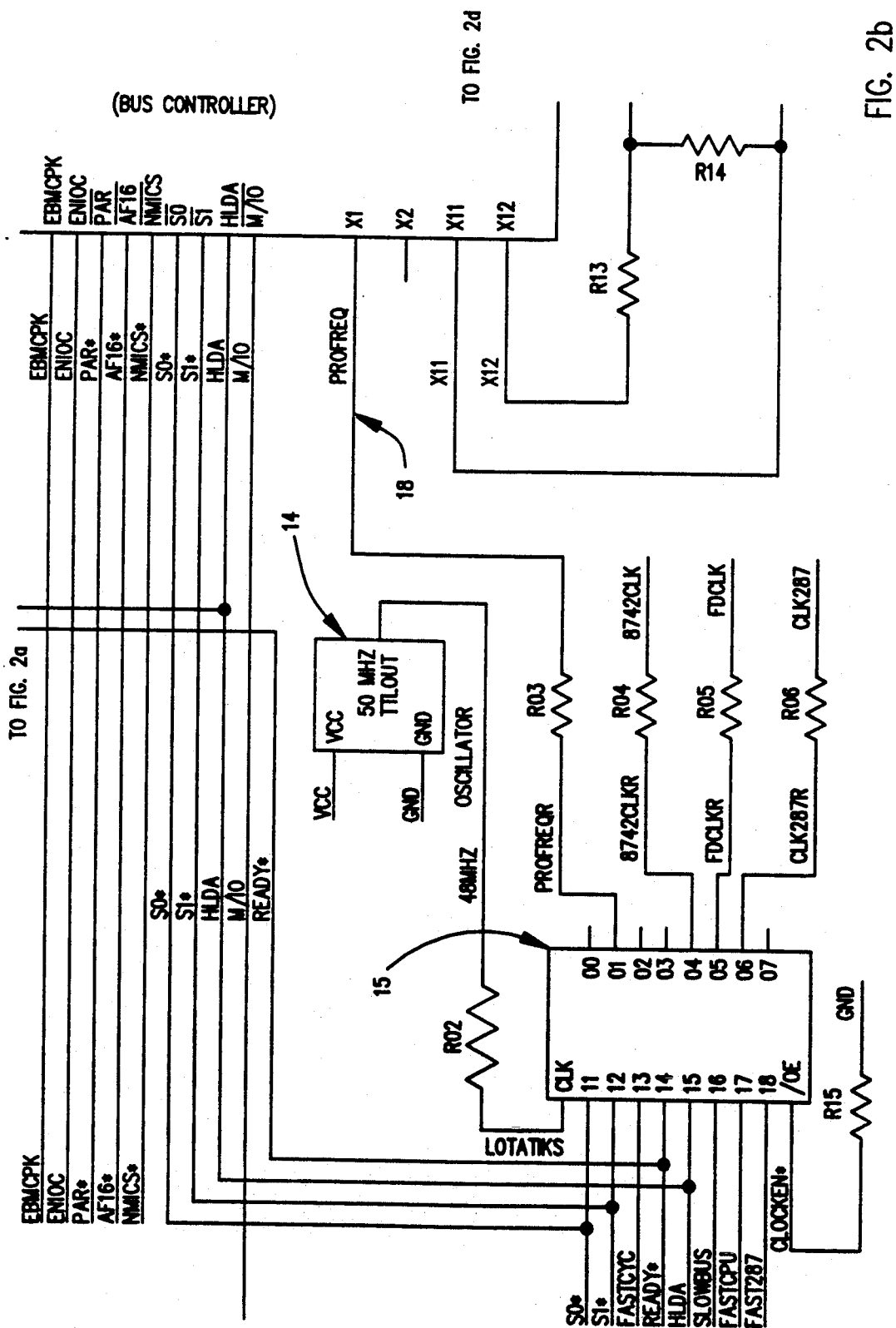
Figure 2C:
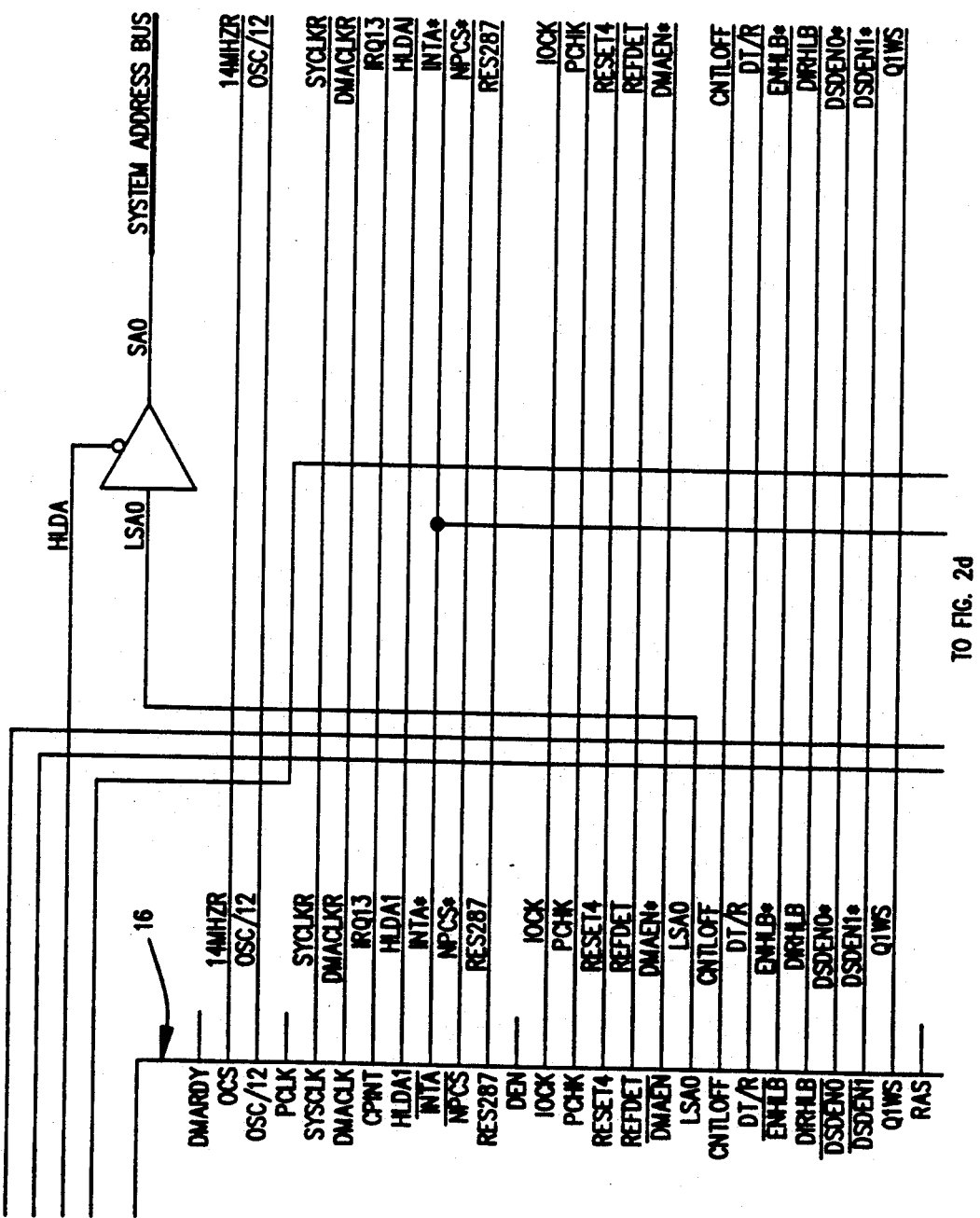
Figure 2D:
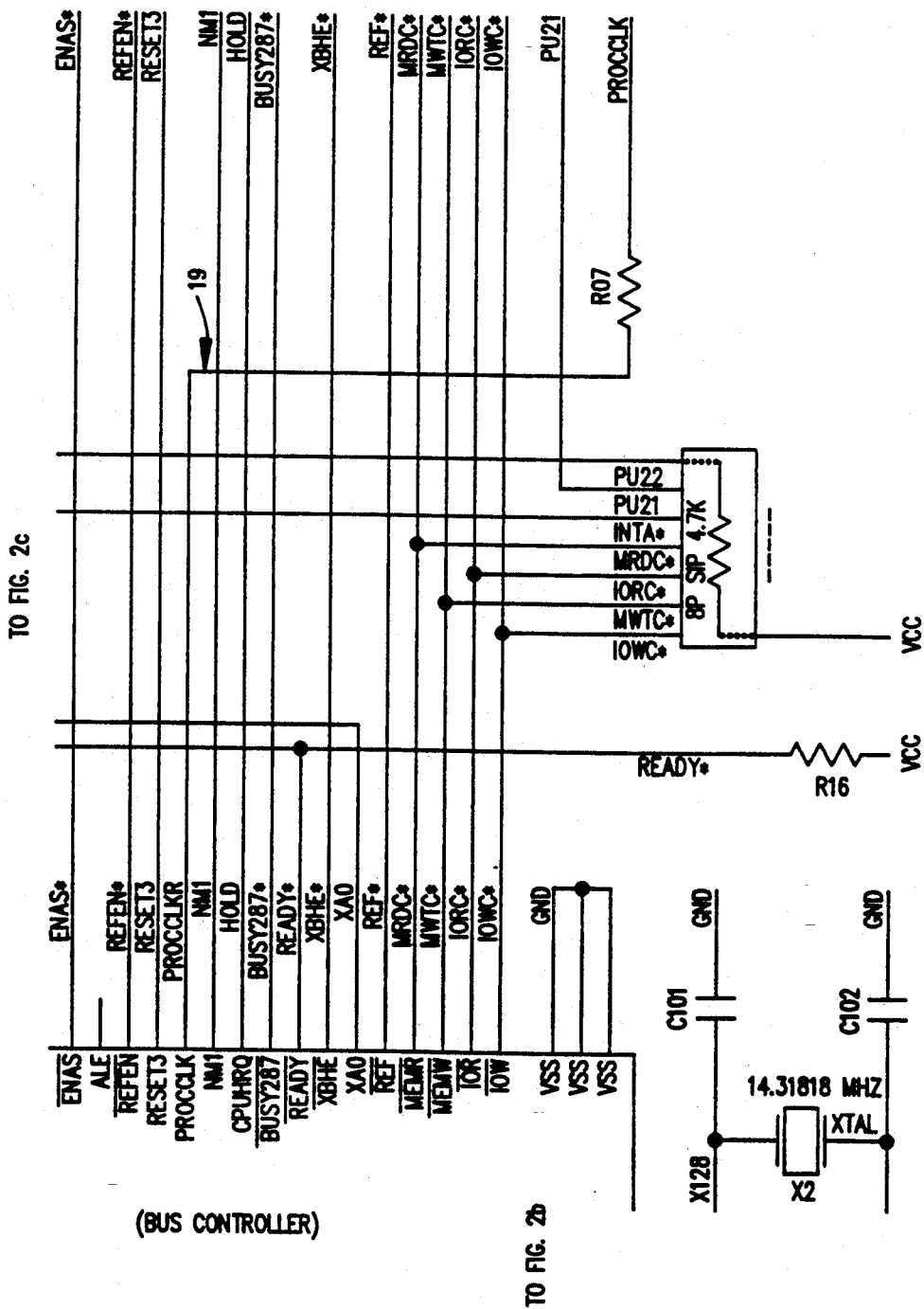
Figure 3:
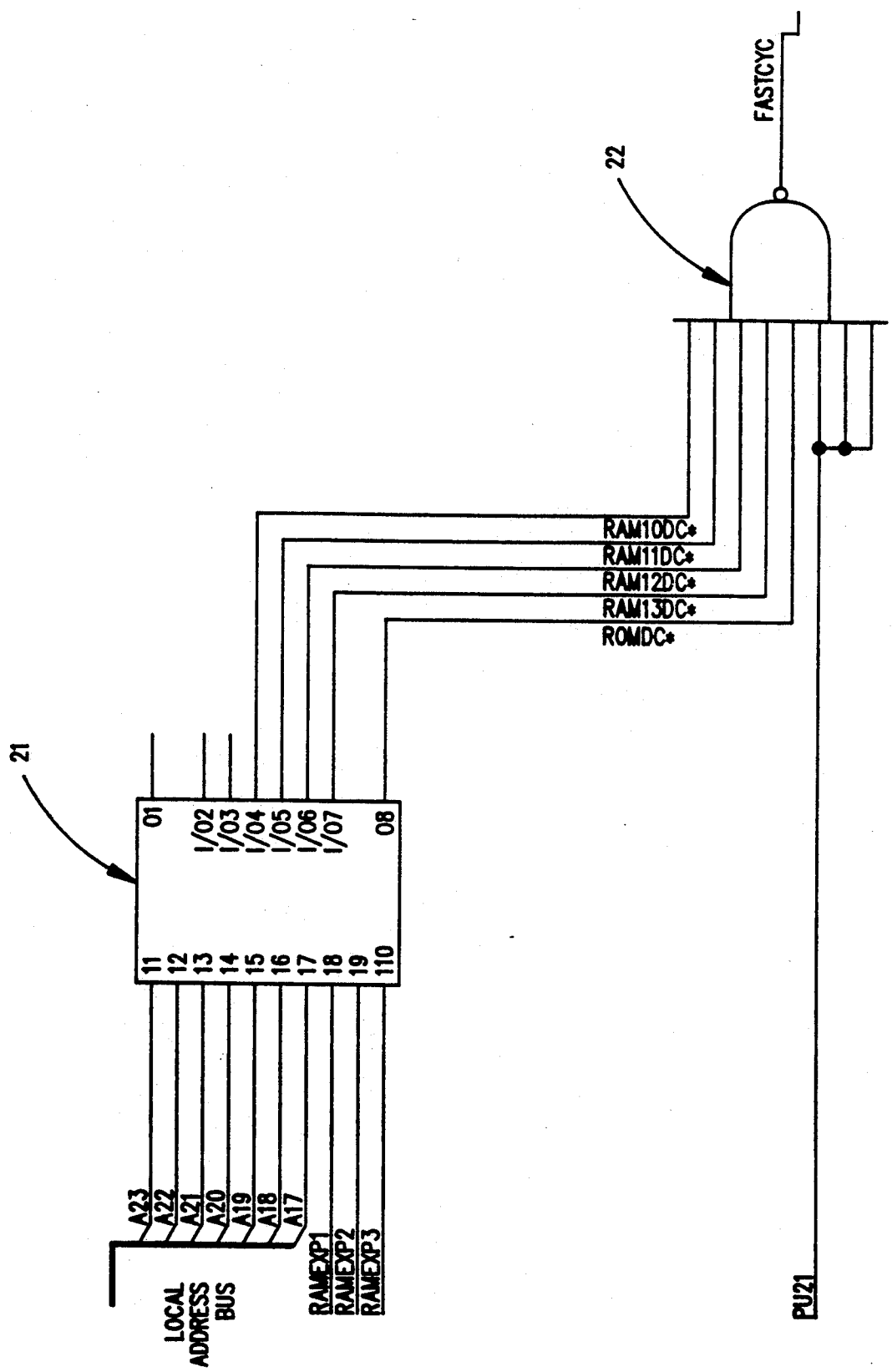
FIG. 3 schematically illustrates the address decoding circuitry of this invention.

FIG. 3 illustrates decode PAL 21 whose output signals of interest, as shown, are gated through NAND gate 22 to provide signal FASTCYC. With reference back to FIG. 2b it can be seen that signal FASTCYC is input to frequency adjust PAL 15.

PAL 15

```
/********************************************************************/
/*                                                                  */
/* clock generator                                                  */
/* rev 1: can only switch between clock speeds at the beginning of a */
/*        cycle.  ignores the ready input.                          */
/*                                                                  */
/********************************************************************/
/* Allowable Target Device Types: 16R8-D                            */
/********************************************************************/

/ Inputs /

Pin 1    = clk      ;/* oscillator output - 48 MHz   */
Pin 2    = szero    ;/* 286 status 0 line            */
Pin 3    = sone     ;/* 286 status 1 line            */
```

```
Pin 4      = sel        ;/* high true decode for system RAM or ROM       */
Pin 5      = ready      ;/* low indicates the end of the cycle           */
Pin 6      = hlda       ;/* high indicates a CPU hold ack                */
Pin 7      = slowbus    ;/* high enables switching to the lower speed    */
Pin 8      = fastcpu    ;/* high = 12 MHz CPU speed, low = 8 MHz         */
Pin 9      = fastndp    ;/* low = 8 MHz 33%,  high = 12 MHz 50%          */

/** Outputs **/

Pin 18     = !profreq   ;/* state var 0                                  */
Pin 17     = !svb       ;/* state var 1                                  */
Pin 16     = !svc       ;/* state var 2                                  */

Pin 15     = !kbdclk    ;/* 8 MHz 50% duty cycle                         */
Pin 14     = !fpyclk    ;/* 16 MHz 66% duty cycle                        */
Pin 13     = !ndpclk    ;/* 8 MHz 33% duty cycle                         */
Pin 12     = !xclkbit   ;/* another bit for the state machine            */

$define    q0    'b'000
$define    q1    'b'001
$define    q2    'b'010
$define    q3    'b'011
$define    q4    'b'100
$define    q5    'b'101
$define    q6    'b'110
$define    q7    'b'111

FIELD  st  =  [svc,svb,profreq];

SEQUENCE  st  { present q0
    if !hlda & !fastcpu next q2 ;
    if !szero & !sel & slowbus next q2 ;
    if !sone  & !sel & slowbus next q2 ;
    default next q1 ;

present q1
    next q0;

present q2
    next q5 ;

present q3   /* this is an invalid state, assume a long cycle */
    next q4 ;

present q4   /* this is an invalid state, assume a long cycle */
    next q2 ;

present q5
    if hlda next q0 ;    /* hold ack cycles always run fast     */
/*  if szero & sone & !ready & fastcpu next q0 ;                */
    if !szero & sel & fastcpu   next q0 ;
    if !sone  & sel & fastcpu   next q0 ;

default next q6;

present q6
    next q2 ;

present q7   /* this is an invalid state, assume a long cycle */
    next q4;
}

$define    s0000    'b'1111
$define    s0001    'b'1110
$define    s0010    'b'1101
$define    s0011    'b'1100
$define    s0100    'b'1011
$define    s0101    'b'1010
$define    s0110    'b'1001
$define    s0111    'b'1000
$define    s1000    'b'0111
$define    s1001    'b'0110
$define    s1010    'b'0101
$define    s1011    'b'0100
$define    s1100    'b'0011
```

```
$define    s1101    'b'0010
$define    s1110    'b'0001
$define    s1111    'b'0000

FIELD  sysclks =  [xclkbit,fpyclk,kbdclk,ndpclk];

SEQUENCE  sysclks  { present    s1110
    next s1100 ;
  present    s1111
    next s1101 ;

present    s1100
    next s0001 ;
  present    s1101
    next s0000 ;
  present    s0000
    next s0100 ;
  present    s0001
    next s0101 ;

present    s0100
    if  fastndp next s0111 ;
    if !fastndp next s0110 ;
  present    s0101
    next s0110 ;

present    s0110
    next s0010 ;
  present    s0111
    next s0011 ;

present    s0010
    next s1111 ;
  present    s0011
    next s1110 ;

/* unused states */ present    s1000
    next s1111 ;
  present    s1001
    next s1111 ;

present    s1010
    next s1111 ;
  present    s1011
    next s1111 ;
}
```

PAL 21, in this preferred embodiment, is an Advanced Micro Devices type PAL16L8-B.

The equation file that follows specifically defines PAL 21.

PAL 21

```
/****************************************************************************/
/*    Allowable Target Device Types:      PAL16L8-B                         */
/****************************************************************************/
/*    1) includes M/IO in the ROM and SEL decoding                          */
/*       - M/IO will be pulled high during HLDA cycles (MASTER* or DMA)     */
/*                                                                          */
/*    2) there is 640k base memory available.                               */
/*       - the first 512k is filled with 256k DRAMs.                        */
/*       - the next 128k is filled with 64kx4 DRAMs.                        */
/*       - the possible memory configurations are:                          */
/*                                                                          */
/*                        accessible   expansion  expansion                 */
/*        j2  j1  j0      base mem     bank 1     bank 2                    */
/*        --------------------------------------------                      */
/*        0   0   0       640k         0          0                         */
/*        0   0   1       256k         0          0                         */
/*        0   1   0       512k         0          0                         */
/*        0   1   1       640k         512k       0                         */
```

```
/*        1   0   0       640k        512k        512k                */
/*        1   0   1       640k        2M          0                   */
/*        1   1   0       640k        2M          512k                */
/*        1   1   1       640k        2M          2M                  */
/*                                                                    */
/********************************************************************/

/ Inputs / pin [1..7]      = [a23..a17]    ;/*                                   */
pin 8           = j0            ;/*                                   */
pin 9           = j1            ;/*                                   */
pin 11          = j2            ;/*                                   */
pin 18          = ref           ;/* 0=refresh cycle                   */
pin 17          = mio           ;/* 1=memory cycle                    */

/ Outputs / pin 19          = !lmeg         ;/*                                   */
pin 12          = !rom          ;/*                                   */
pin 16          = !sel0         ;/*                                   */
pin 15          = !sel1         ;/*                                   */
pin 14          = !sel2         ;/*                                   */
pin 13          = !sel3         ;/*                                   */

/ Declarations and Intermediate Variable Definitions / field memaddr   = [a23..a17] ;
field sw        = [j2..j0] ;

/ Logic Equations / lmeg    = memaddr:[C0000C..OFFFFF]
        # !ref ;

rom     = memaddr:[0E0000..0FFFFF] & mio & ref
        # memaddr:[FE0000..FFFFFF] & mio & ref ;

sel0    = memaddr:[000000..07FFFF] & mio & sw:[0]
        # memaddr:[000000..03FFFF] & mio & sw:[1]
        # memaddr:[000000..07FFFF] & mio & sw:[2]
        # memaddr:[000000..07FFFF] & mio & sw:[3]
        # memaddr:[000000..07FFFF] & mio & sw:[4]
        # memaddr:[000000..07FFFF] & mio & sw:[5]
        # memaddr:[000000..07FFFF] & mio & sw:[6]
        # memaddr:[000000..07FFFF] & mio & sw:[7]
        # !ref ;

sel1    = memaddr:[080000..09FFFF] & mio & sw:[0]
        # memaddr:[080000..09FFFF] & mio & sw:[3]
        # memaddr:[080000..09FFFF] & mio & sw:[4]
        # memaddr:[080000..09FFFF] & mio & sw:[5]
        # memaddr:[080000..09FFFF] & mio & sw:[6]
        # memaddr:[080000..09FFFF] & mio & sw:[7]
        # !ref ;

sel2    = memaddr:[100000..17FFFF] & mio & sw:[3]
        # memaddr:[100000..17FFFF] & mio & sw:[4]
        # memaddr:[100000..2FFFFF] & mio & sw:[5]
        # memaddr:[100000..2FFFFF] & mio & sw:[6]
        # memaddr:[100000..2FFFFF] & mio & sw:[7]
        # !ref ;

sel3    = memaddr:[180000..1FFFFF] & mio & sw:[4]
        # memaddr:[300000..37FFFF] & mio & sw:[6]
        # memaddr:[300000..4FFFFF] & mio & sw:[7]
        # !ref ;
```

MODE OF OPERATION OF THE INVENTION

Please refer first to FIG. 3. Assuming that the bus address information coming in to decode PAL 21 is indicative of the need for the use of the associated bus, then FASTCYC will be present at the output of NAND gate 22.

Now refer to FIG. 2b where signal FASTCYC is shown entering frequency adjust PAL 15. Note that oscillator 14 provides a 50 Mhz frequency which clocks PAL 15. As a result of the connections made within PAL 15, note PROFREQ, out of PAL 15, is a signal which is 50 MHz divided by 3 t equal 16.67 MHz.

This signal is applied to the bus controller 16 and goes out on line 19 through resistor R07 as signal PROCCLK, at the new clock frequency for the computer system to match that of the bus. The 16.67 MHz clock provides a system operating at 8.33 MHz, to approximate the 8 MHz frequency of the associated bus.

Figure 1A:
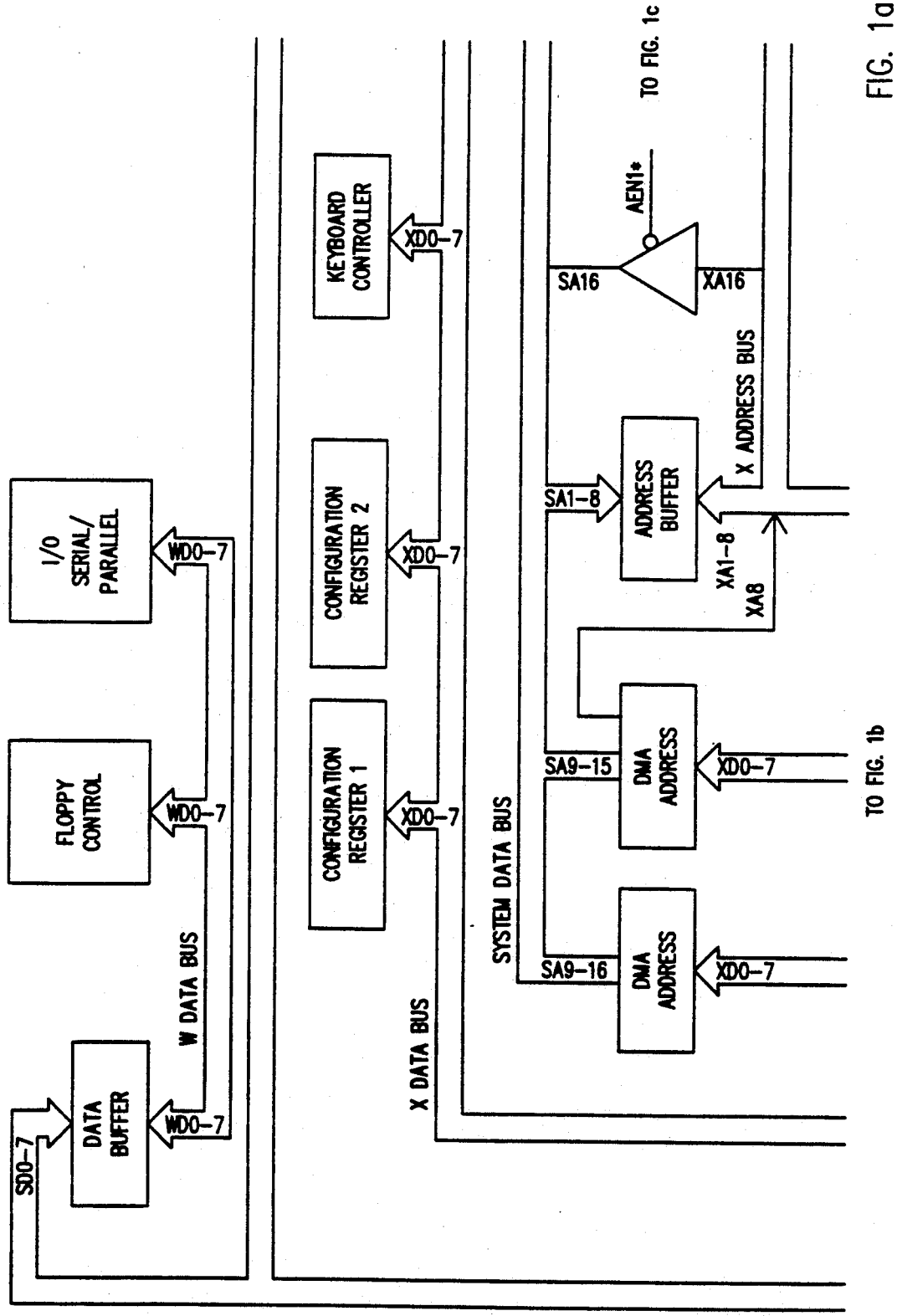
FIGS. 1a-1d are block diagrams of the digital computer system of this invention.
Figure 1B:
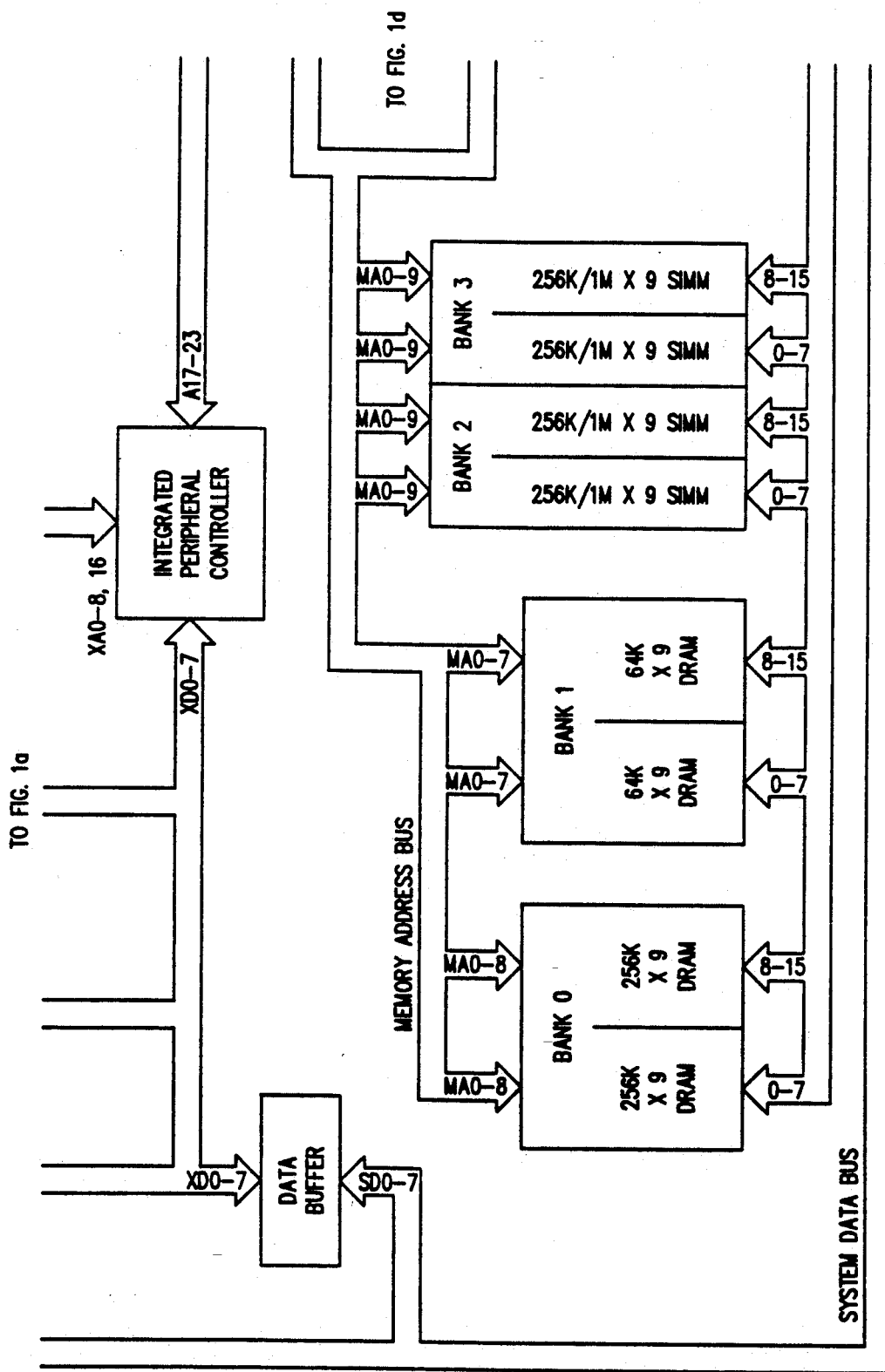
Figure 1C:
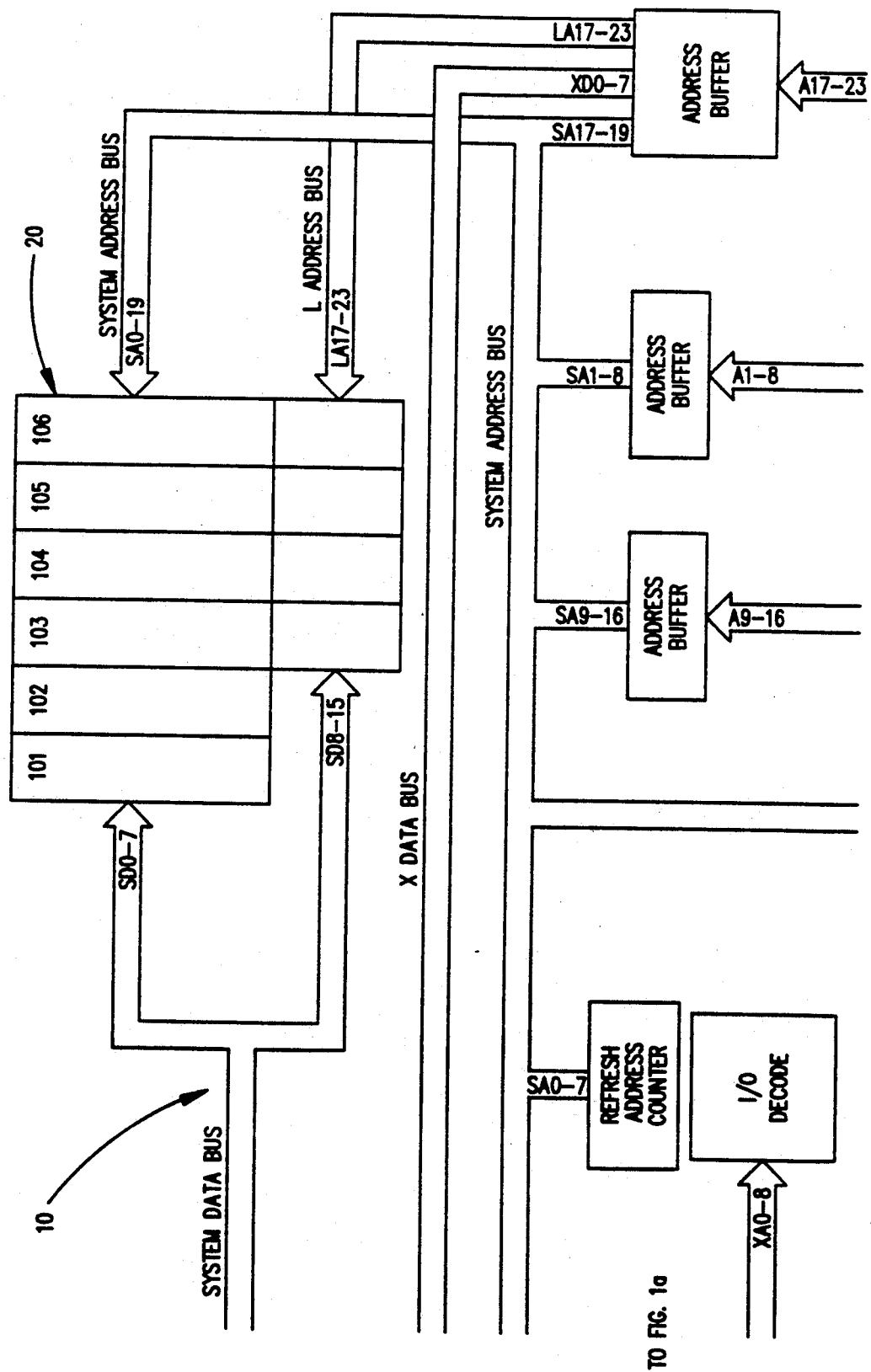
Figure 1D:
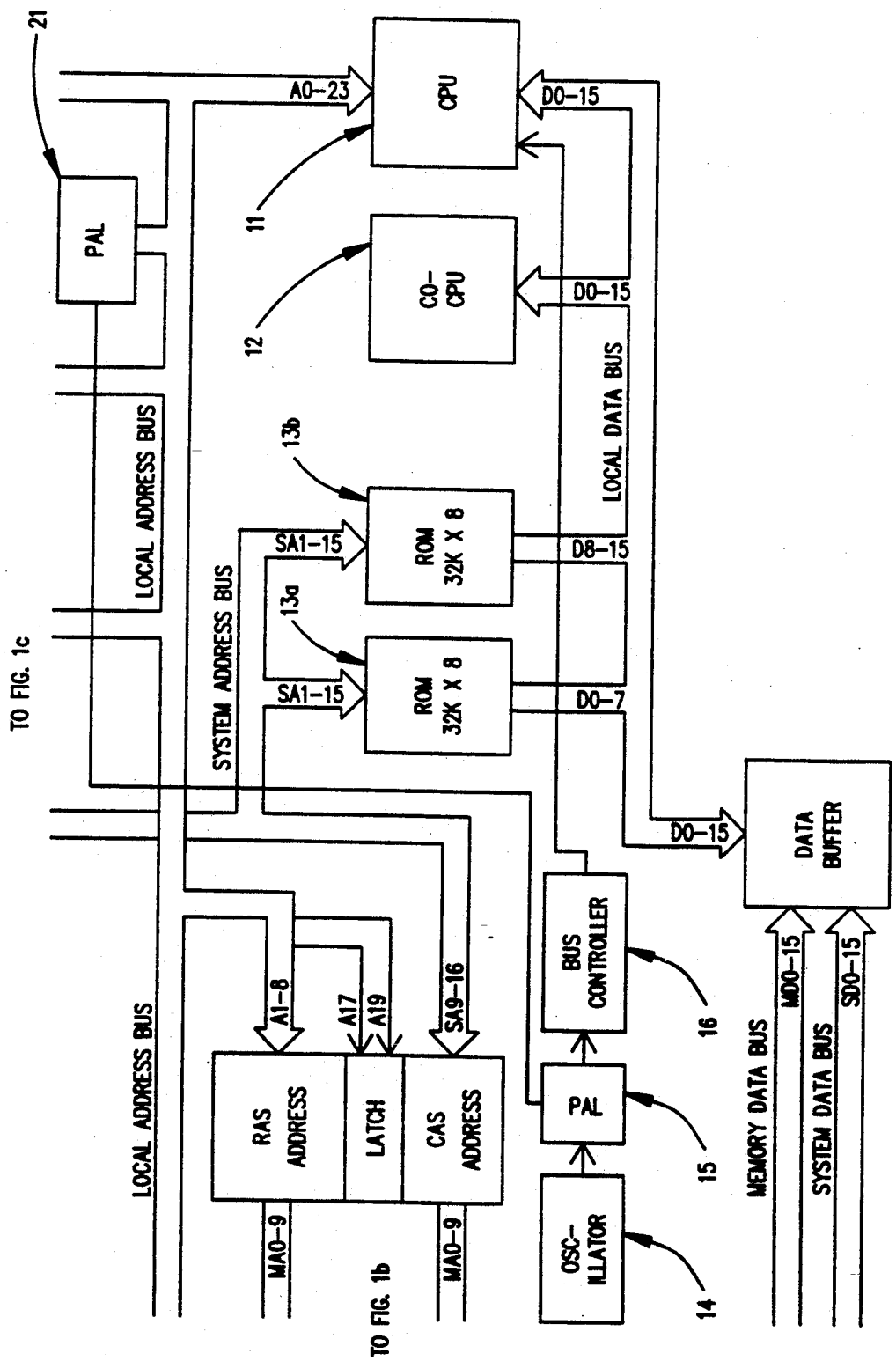

Signal PROCCLK is applied, as shown on FIG. 1d to

CPU 11 to serve as the system clock during the reference to the external device through the associated bus.

When the reference is completed, then the decode through decode PAL 21 will provide a low output from NAND gate 22 thus causing the normal clock frequency for the system to be provided to CPU 11.

Those skilled in the art may understand that various components can be substituted for those shown herein without departing from the spirit and the scope of this invention which is limited only by the appended claims.

I claim:

1. A digital computer having internal and external devices, and having circuitry for adapting its normal clock frequency to a clock frequency of an associated bus connected to the external devices, wherein said associated bus is operating at a different clock frequency, comprising:
   (a) central processor means;
   (b) clock oscillator means;
   (c) frequency adjusting means, connected to receive the output from the clock oscillator means for providing a system clock to the central processor means at a desired frequency; and for providing the normal clock frequency to the central processor means when the desired frequency is not the normal clock frequency and immediately after said desired frequency is no longer required;
   (d) addressing means, connected to the central processor means, for referencing the internal and external devices; and
   (e) decoding means, connected to the addressing means, to detect desired references to the external devices, and connected to the frequency adjusting means to cause the frequency adjusting means to adjust the system clock to said desired frequency, wherein said desired frequency is approximately the clock frequency of the associated bus, thereby causing the central processor means to operate at the same frequency as the associated bus.

2. The system of claim 1 wherein the clock oscillator means comprises a crystal oscillator.

3. The system of claim 1 wherein the frequency adjusting means comprises divider means for dividing the output of the clock oscillator to a desired system clock frequency.

4. The system of claim 1 wherein the decoding means comprises a programmable array of logic (PAL), programmed to detect a plurality of addresses for external devices.

5. The system of claim 1 wherein the frequency adjusting means further comprises a PAL, programmed to selectively divide the clock oscillator frequency by a divisor to generate a system clock frequency approximately equal to the clock frequency of the associated bus when the bus is used to access any of the external devices.

* * * * *